(12) United States Patent
Dropps

(10) Patent No.: US 9,281,953 B1
(45) Date of Patent: Mar. 8, 2016

(54) SYSTEMS AND METHODS FOR ROUTING MULTICAST PACKETS

(71) Applicant: QLOGIC, Corporation, Aliso Viejo, CA (US)

(72) Inventor: Frank R. Dropps, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 276 days.

(21) Appl. No.: 14/034,200

(22) Filed: Sep. 23, 2013

(51) Int. Cl.
*H04L 12/18* (2006.01)
*H04L 12/709* (2013.01)

(52) U.S. Cl.
CPC ............ *H04L 12/185* (2013.01); *H04L 45/245* (2013.01)

(58) Field of Classification Search
None
See application file for complete search history.

(56) References Cited

U.S. PATENT DOCUMENTS

| | | | |
|---|---|---|---|
| 7,697,525 B2* | 4/2010 | Zelig | H04L 45/00 370/230.1 |
| 8,694,654 B1* | 4/2014 | Kalusivalingam et al. | ... 709/228 |
| 2012/0182866 A1* | 7/2012 | Vinayagam et al. | .......... 370/228 |
| 2013/0028072 A1* | 1/2013 | Addanki | ............... H04L 49/557 370/218 |
| 2013/0287020 A1* | 10/2013 | York | ............................. 370/389 |
| 2013/0336317 A1* | 12/2013 | Mithyantha et al. | .......... 370/390 |
| 2014/0153570 A1* | 6/2014 | Balakavi | ............. H04L 45/7453 370/390 |

* cited by examiner

*Primary Examiner* — Anh Ngoc Nguyen
(74) *Attorney, Agent, or Firm* — Klein, O'Neill & Singh, LLP

(57) ABSTRACT

Method and system for a network device are provided. The device includes a port for receiving a multicast packet and a multicast data structure for maintaining information regarding a multicast group to which the multicast packet is to be sent. When the port is a part of a link aggregation group (LAG), then any port that is a member of the LAG is removed from the multicast group such that the multicast packet is not sent to any member of the LAG.

18 Claims, 6 Drawing Sheets

| Ethernet Header 502 | FCOE Header 504 | SOF 506 | FC Header 508 | Pay Load 510 | FC CRC 512 | EOF 514 | Ethernet FCS 516 |

500

| Word/Bits | FC Header 508 ||||
|---|---|---|---|---|
| | 31         24 | 23         16 | 15         08 | 07         00 |
| | R_CTL 508C | D_ID 508A |||
| | CS_CTL/Priority | S_ID 508B |||
| | Type | F_CTL |||
| | SEQ_ID | DF_CTL | SEQ_CNT ||
| | OX_ID || RX_ID ||
| | Parameter ||||

SYSTEMS AND METHODS FOR ROUTING MULTICAST PACKETS

BACKGROUND

1. Technical Field

The embodiments disclosed herein are related to networks and network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication, for example, switches, adapters and other similar devices.

Network devices typically include a multi-port device where each port manages a point-to-point connection between itself and an attached system. Each port can be attached to a server, peripheral, input/output subsystem, bridge, hub, router, or another switch, where each of the aforementioned network devices also has one or more ports. Different network and storage protocols may be used to handle network information and storage information, for example, Fibre Channel, Ethernet and others.

Network devices often have to transmit packets to multiple ports. Such packets are referred to as broadcast or multicast packets. The multicast packets are typically identified by special attributes, for example, in the case of a Fibre Channel packet, a destination address of 0xFF_FFFF denotes a multicast packet. For an Ethernet packet, bit 40 of a destination media access control (MAC) address identifies the packet as a multicast packet.

Routing multicast packets can be a challenge. For example, routing multicast packets to multiple ports of a network device may be a part of a link aggregation group (LAG). LAG (Link Aggregation Group) is a method of inverse multiplexing using multiple Ethernet links, thereby increasing bandwidth and providing redundancy. LAGs are defined by the IEEE 802.1AX-2008 standard, which provides link aggregation allows one or more links to be aggregated together to form a LAG, such that a MAC (Media Access Control) client can treat the LAG as if it were a single link. This Layer 2 transparency may be achieved by the LAG using a single MAC address for all the device ports in the LAG group. LAG can be configured as either static or dynamic. Dynamic LAG uses a peer-to-peer protocol for control, called the Link Aggregation Control Protocol (LACP). This LACP protocol is defined within the 802.1AX-2008 standard.

It is undesirable to multicast a packet to all the ports within a LAG, when a port within the LAG receives the packet. If multicast packets are transmitted on more than one port of the LAG, multicast loops or storms can occur. This may consume more link bandwidth to transmit multiple copies of the same packet to the same location.

It is also undesirable to send the multicast packet from the same port that received the packet because it may also cause a multicast storm. These multicast loops or storms occur because a destination that receives the multicast packet resends the same packet to other ports within a multicast group. If the packet loops back to the sender it may get resent again various times resulting in an endless loop that consumes significant amounts of overall network bandwidth. Continuous efforts are being made to improve handling of multicast packets.

BRIEF DESCRIPTION OF THE DRAWINGS

The various present embodiments now will be discussed in detail with an emphasis on highlighting the advantageous features. These embodiments depict the novel and non-obvious systems and methods for packet grouping in networks shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

Figure 1:
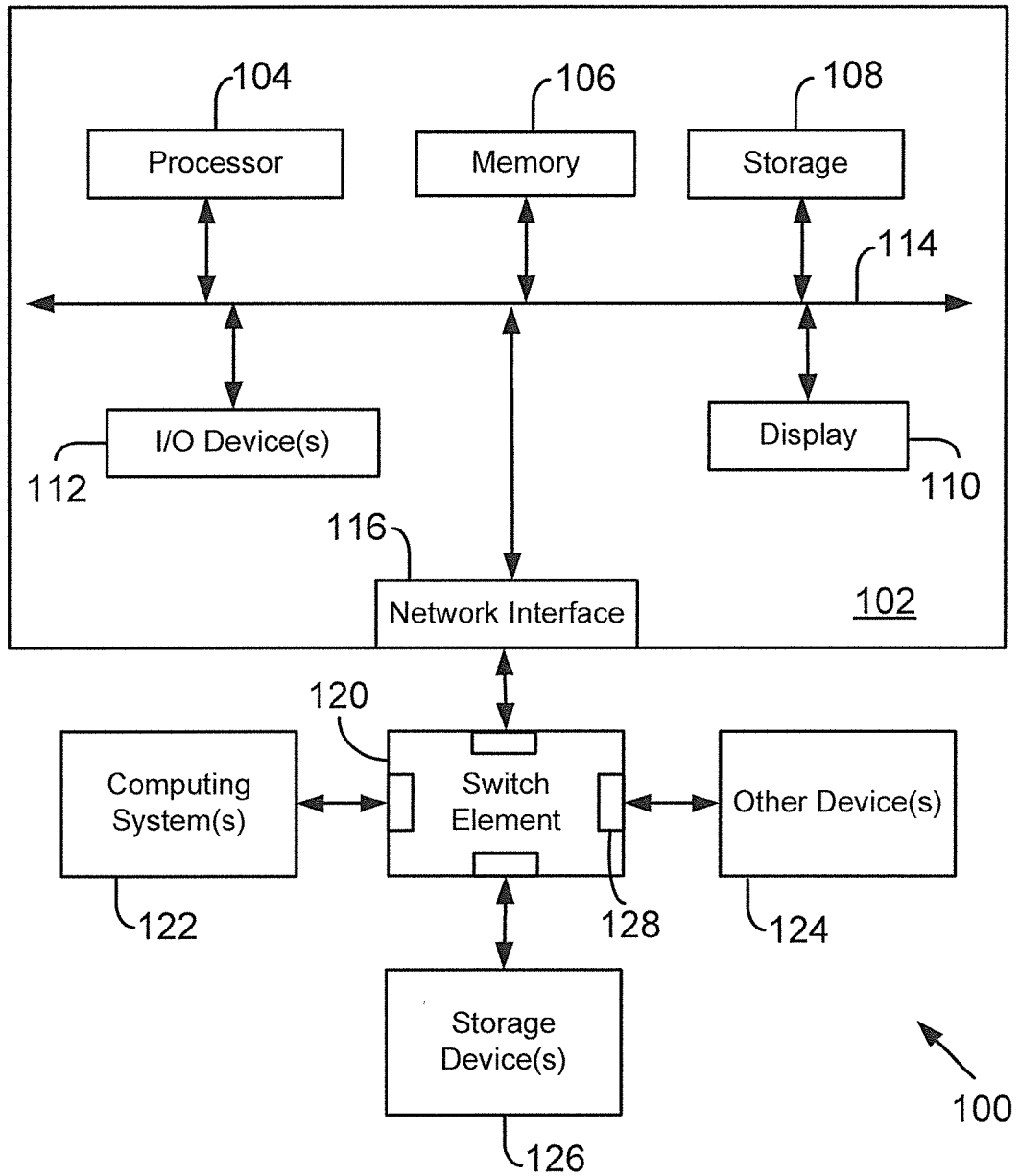

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). The embodiments disclosed herein, may be implemented as a computer process (method), a computing system, or as an article of manufacture, such as a computer program product or non-transitory, computer-readable media. The computer program product may be computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet standards (or technologies). However, these protocols are used merely for ease of reference and to provide examples. The present embodiments are not limited to Fibre Channel and Ethernet standards/technologies.

Fibre Channel (FC) is a set of American National Standards Institute (ANSI) standards. Fibre Channel technology provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use high speed Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor, processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114.

The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter.

Network interface 116 may include a processor, memory and a plurality of ports (not shown). The ports are used to receive and send information, while the processor (not shown) executes firmware instructions out of the memory (not shown). The multicast routing described below may be implemented at network interface 116.

In one embodiment, the processor 104 of the host system 102 may execute various applications, for example, an e-mail server application, databases, and other application types.

Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports 128 for receiving and transmitting information, for example, node ports (N_Ports), Fabric ports (F_Ports), and expansion ports (E_Ports). Node ports may be located in a node device, e.g. the network interface 116 of the host system 102 and an interface (not shown) for the storage devices 126. Fabric ports are typically located in Fabric devices, such as the switch element 120. Details regarding the switch 120 are provided below.

Figure 2A:
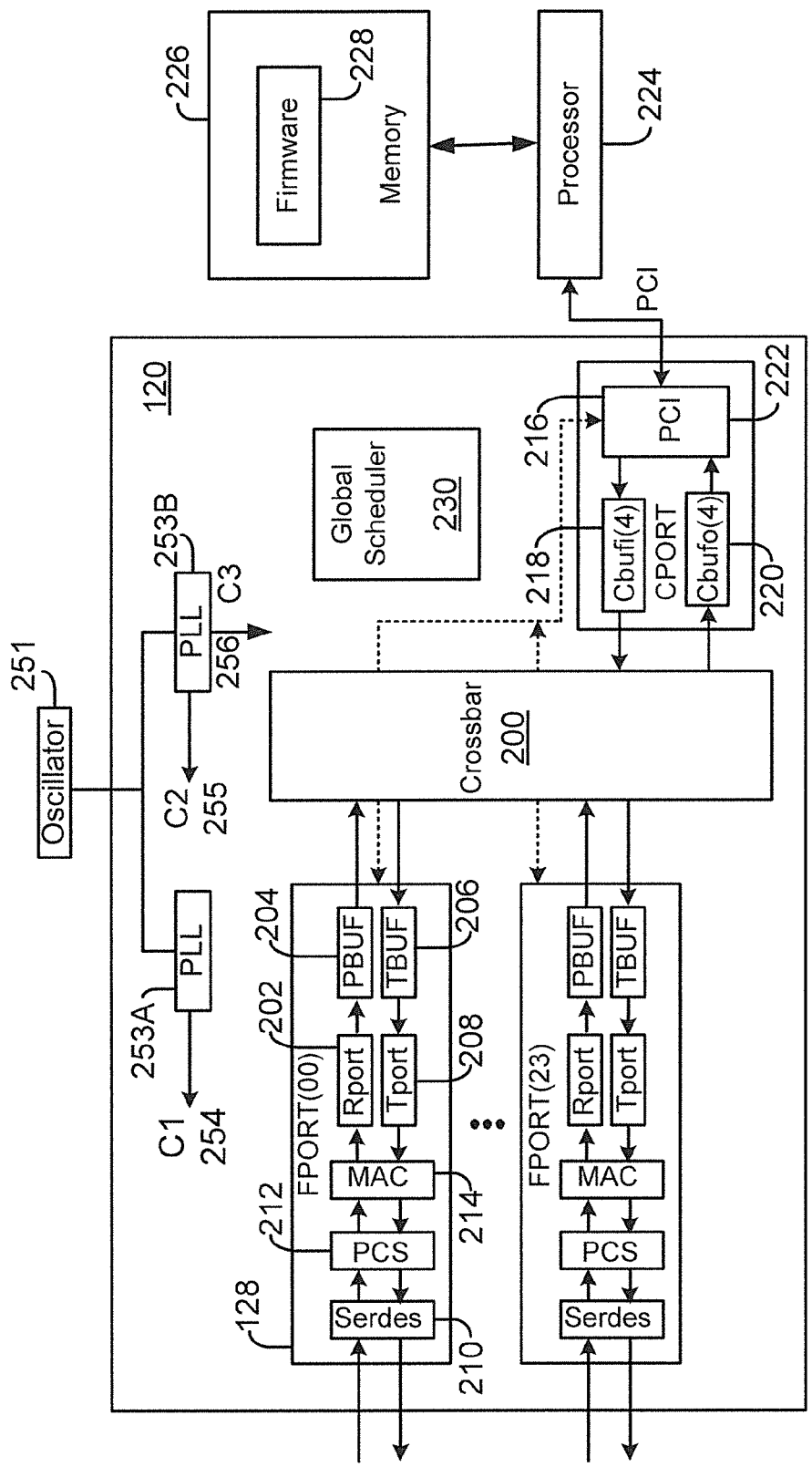
FIG. 2A is a functional block diagram of a switch element according to the present embodiments.

FIG. 2A is a high-level block diagram of switch element 120, also referred to as the switch 120. Switch element 120 may be implemented as an application specific integrated circuit (ASIC) having a plurality of ports 128. An external oscillator 251 may be used to power a plurality of phase locked loop (PLL) circuits 253A-253B to generate a plurality of clocks, C1 254, C2 255 and C3 256. As an example, C1 254 may be 425 MHz when a port is configured to operate as a Fibre Channel port, C2 255 may be 312 MHz when a port is configured to operate as an Ethernet port, and C3 256 may be a system clock of 825 MHz. The embodiments disclosed herein are not limited to any particular clock rate.

Ports 128 are generic (GL) ports and may include an N_Port, F_Port, FL_Port, E-Port, or any other port type. Ports 128 may be configured to operate as Fibre Channel, FCoE or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate ports 128 and port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) 208 via the crossbar 200. The TPORT 208 includes a memory device shown as a transmit buffer (TBUF) 206. The TBUF 206 may be used to stage frames or information related to frames before being transmitted. The TPORT also includes a shared MAC and PCS or shares PCS 212 and MAC 214 of the RPORT 202. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of independently, operating sub-ports, each uniquely identified for receiving and sending frames. The sub-configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, one double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
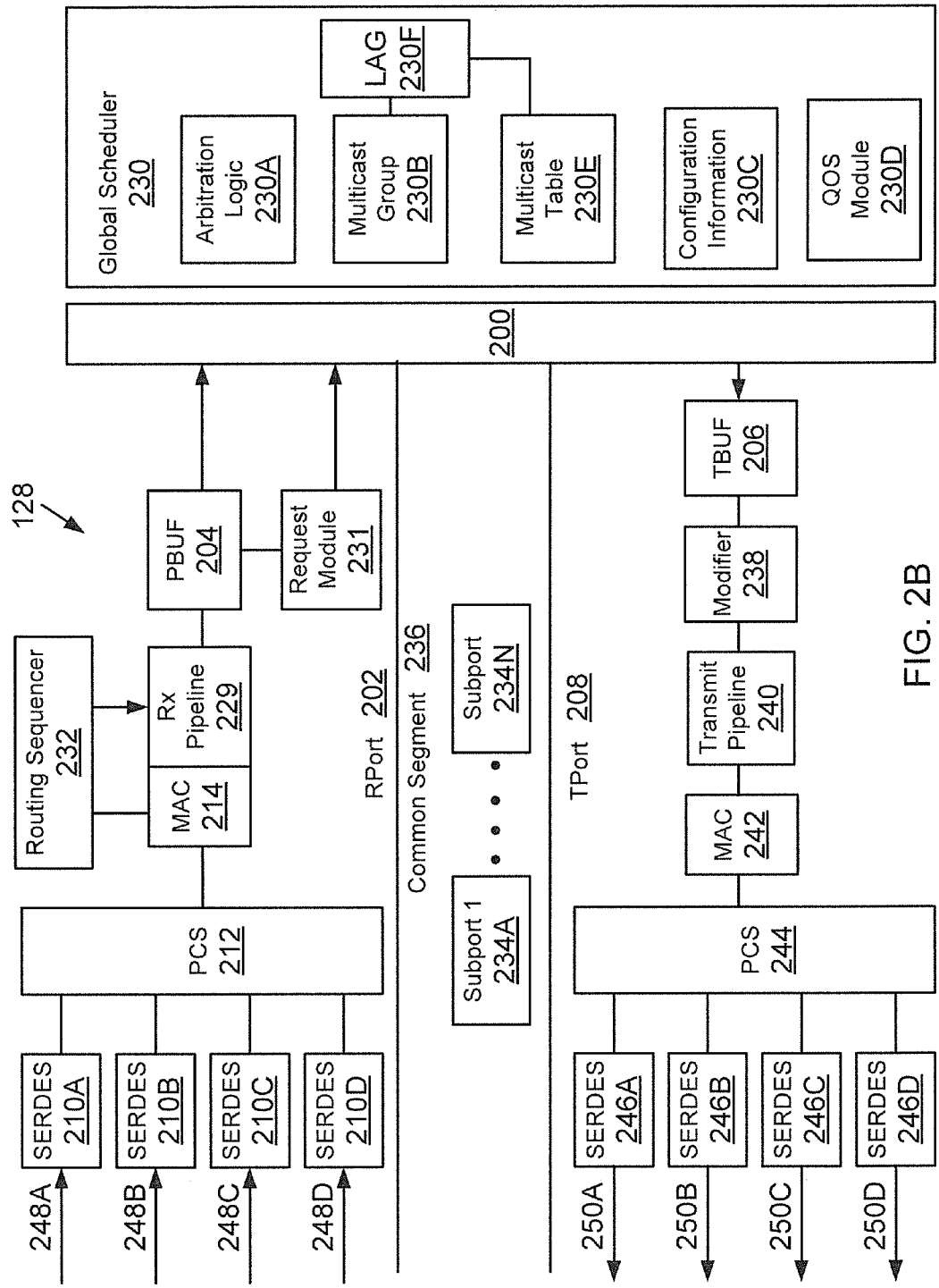
FIG. 2B is a functional block diagram of a base-port, according to one embodiment.

FIG. 2B shows an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128. In one embodiment, base-port may be configured to include a plurality of independently operating sub-ports. The configuration information/logic 234A-234N for each sub-port may be stored in common segment 236.

RPORT 202 may include or has access to a plurality of network links, for example, four independent physical network links (or lanes) 248A-248D, each configured to operate as a portion of an independent sub-port within base-port 128. Each network link is coupled to a SERDES 210A-210D that share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. PCS 212 and MAC 214 may be a part of the receive pipeline 229.

Incoming frames are received via one of the network links 248A-248N. The received frame is processed by the appropriate SERDES 210A-210D and then sent to the PCS 212. After PCS 212 processes the frame, the frame is provide to MAC 212 that is time shared among a plurality of sub-ports.

This means that for a certain time segment (for example, clock cycles), MAC 214 may be used by one of the sub-ports. After the MAC 214 processes the frame it is sent to receive pipeline 229 that is also time shared. Information regarding the frame or a copy of the frame is also provided to a routing sequencer (or module) 232 that determines the destination of the received packets. In one embodiment, a frame whose destination is processor 224 is given the highest priority, followed by a frame that is routed by a TCAM (ternary content addressable memory) or steering registers located within a routing sequencer 232. More than one routing sequencer 232 may be used for each base-port 128.

Frames that are ready to be sent out are then staged at PBUF 204. PBUF 204 may have a plurality of queues (slots/locations) that may be referred to as receive queues. The receive queues temporarily store frames, until a request to move the frame is granted.

To move frames from the receive queues; a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 stores configuration information 230C for various ports and some of that information may be used to select requests. Scheduler 230 also includes arbitration logic 230A that performs dual stage arbitration for processing requests from various base-ports. Scheduler 230 also maintains a data structure at a memory labeled as multicast group 230B. Multicast group 230B includes or has access to a multicast vector table 230E that is described below. The data structure stores information for identifying multicast groups that may receive multicast frames, i.e. frames that are destined to multiple destinations. Scheduler 230 uses the information for processing requests that involve multicast frames. Scheduler 230 also uses a LAG table 230F for routing multicast frames, as described below. Scheduler 230 further includes a quality of service (QOS) module 230D that monitors QOS data, which is used to select requests for processing packets.

Frames for transmission via TPORT 208 move via TBUF 206 and a modifier 238. In one embodiment, modifier 238 may be used to insert, change or remove information from an outgoing frame. The modification is based on the frame type and transmit virtual queue. The time shared transmit pipeline 240 and MAC 242 are used to process outgoing frames. PCS 244, SERDES 246A-246D are used similar to PCS 212 and SERDES 210A-210D. PCS 244 and MAC 242 may be a part of transmit pipeline 240.

Network links 250A-250D are similar to links 248A-248D, except links 250A-250D are used to transmit frames. Furthermore, links 248A-248D and 250A-250D may be a part of the same physical links that can receive and transmit data. In one embodiment, there are multiple requests and grants processed simultaneously.

Figure 3:
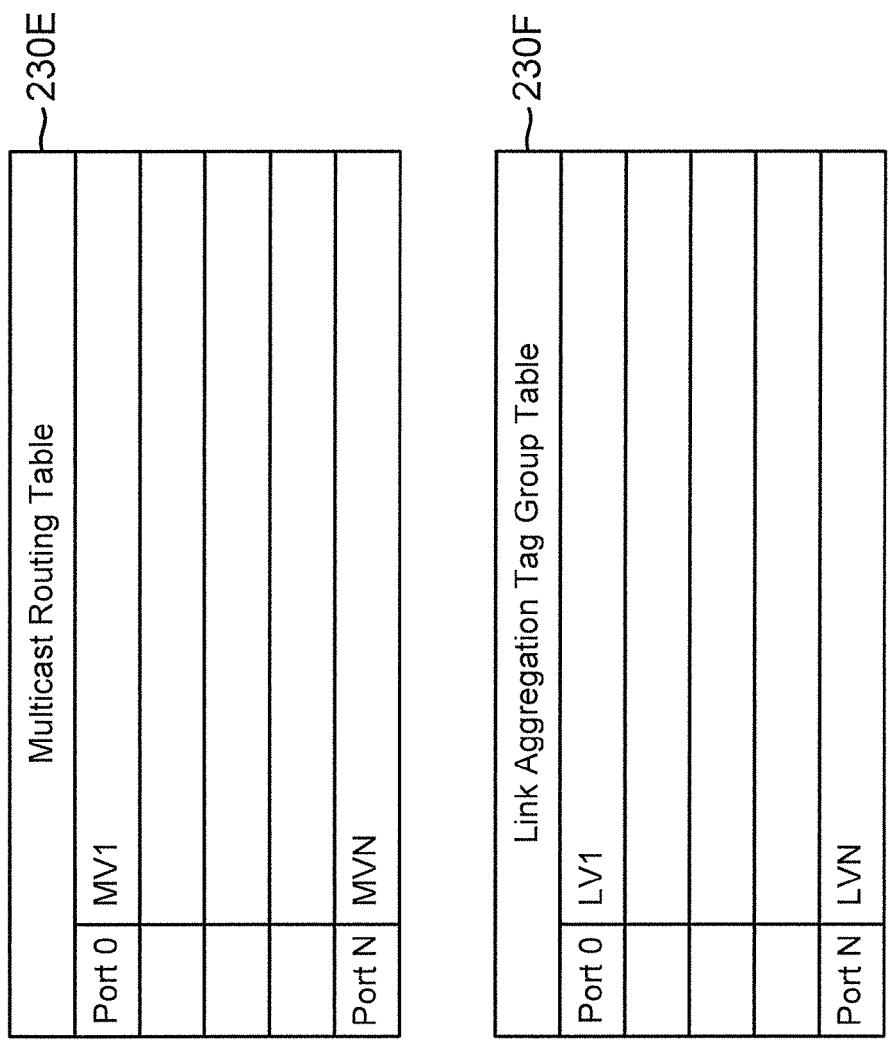
FIG. 3 shows examples of data structures for multicast packet routing, according to one embodiment.

FIG. 3 shows a block diagram of the multicast routing table 230E and the LAG table 230F (may also be referred to as data structures 230E and 230F). Data structure 230E includes an entry for each port (shown as Port 0 to Port N). A multicast vector (for example, MV1-MVn) includes a plurality of bit settings for ports within a multicast group. A destination MAC address or Fibre Channel destination address may be used as a multicast group identifier and may also be used to obtain a multicast vector corresponding to the MAC address and the destination address from data structure 230E. Bit values in the multicast vector may be used to indicate the ports that are within the multicast group. For example, if bit 0 of a multicast vector is set then Port 0 is considered to be part of the multicast group. If bit 0 is not set then Port 0 is not considered to be part of the multicast group. There would be 1 bit in the multicast vector for each port of a device.

Data structure 230F stores a LAG vector for each port. For example, LAG vector LV1 identifies the various ports that are within a LAG for Port 0. In one embodiment, a requesting port number may be used to obtain a LAG vector. The LAG vector may include bit settings for ports that may be a part of the LAG for the requesting port number. A bit value of 1 may be used to indicate a LAG member and bit value of 0 may be used to indicate that a port is not a part of the LAG. The use of LAG vectors and the multicast vectors is described below in detail. It is noteworthy that data structure 230F may be stored at any location within switch element 120. It is also noteworthy that there may be multiple LAG vectors for each port; one for a unique tag or a VLAN (virtual local area network) identifier field.

Figure 4:
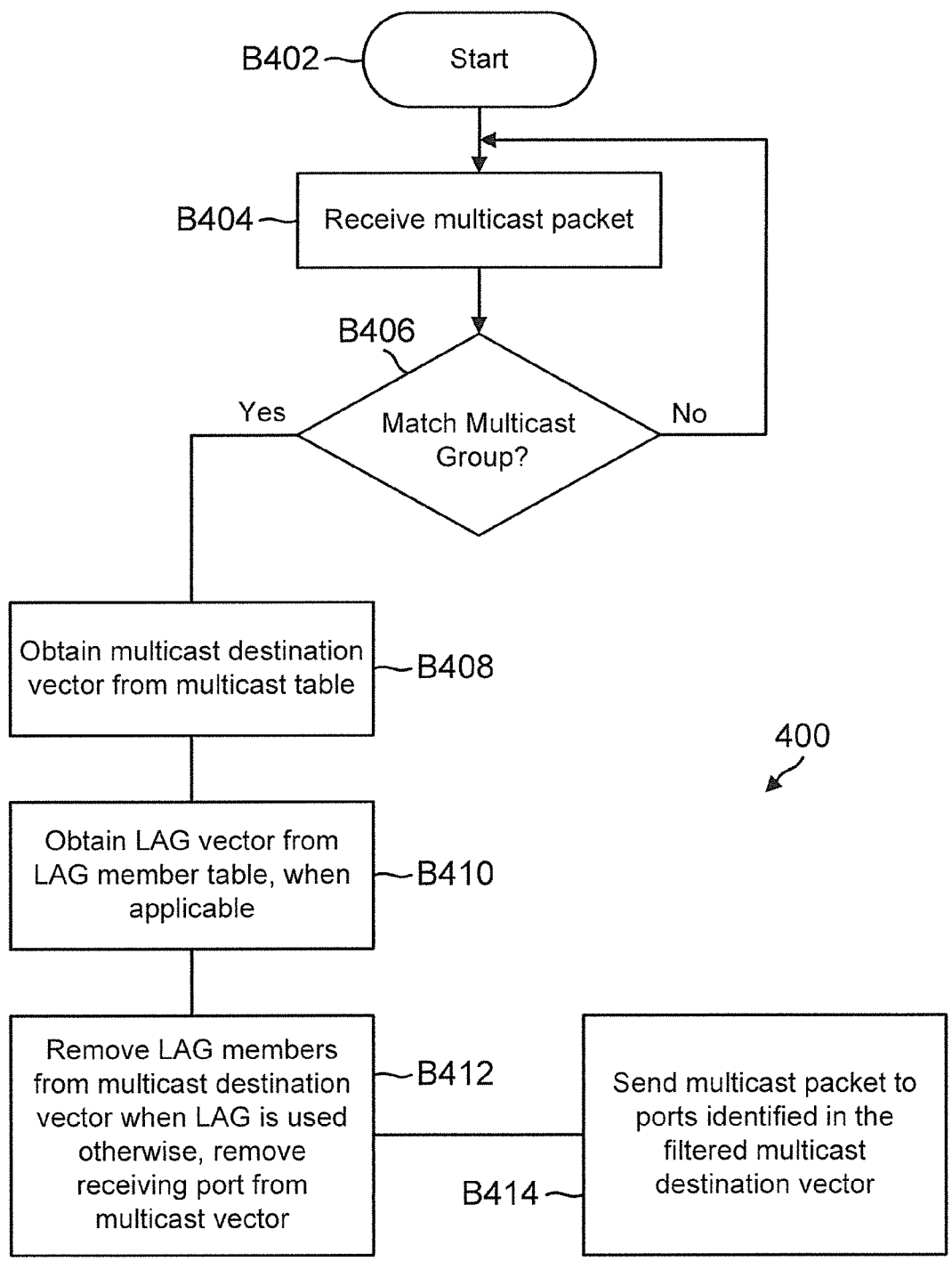
FIG. 4 illustrates a process flow diagram for handling multicast packets, according to one embodiment.

FIG. 4 shows a process 400 for handling multicast packets, according to one embodiment. The process begins in block B402, when the switch element 120 is initialized and operational. In block B404, when a multicast packet is received. In block B406, routing sequencer 232 determines if there is a multicast group match. This may be performed by a performing a TCAM search or other type of packet header comparison. A TCAM may be maintained by routing sequencer 232 that stores information regarding multicast groups being associated with certain packet header information, for example, source and destination addresses. If there is no match, the process simply reverts back to B404.

If there is a match, then in block B408 by making a request to scheduler 230, the multicast destination vector is obtained from data structure 232E described above with respect to FIG. 3.

In block B410, the LAG vector is obtained from data structure 230F. The LAG vector in this case corresponds to the port that received the multicast packet and may also correspond to the optional packet tag of the multicast packet. In block B412, the various LAG port members are removed from the multicast vector to avoid a multicast storm. If LAG is not used, then only the receiving port is removed from the multicast vector to avoid a multicast storm. Thereafter, in block B414, the multicast packet is sent to the ports that are identified in the filtered multicast vector. This process prevents multicast packet loops or storms.

Figures 5A, 5B, 5C:
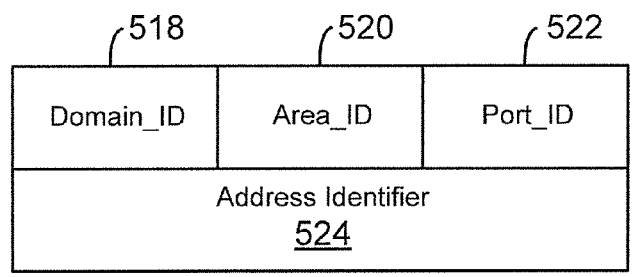
FIGS. 5A-5C illustrate examples of frame formats used by the current embodiments.

FIG. 5A shows an example of an FCoE packet format 500 for processing network and storage traffic, according to the present embodiments. The FCoE packet 500 includes an Ethernet header 502. In one embodiment, the Ethernet header 502, which includes the Ethernet type, may be fourteen bytes in length, for example. The Ethernet header may also include optional Tag fields (not shown). The FCoE packet 500 also includes an FCoE header 504 that includes a number of reserved fields. A start of frame (SOF) 506 indicates the beginning of the embedded Fibre Channel frame and may be one byte, for example.

The FCoE packet 500 may also include a Fibre Channel header (FC Header) 508 that may be 24 bytes long with a payload 510. The Fibre Channel cyclic redundancy code (CRC) 512 may be 4 bytes and the Fibre Channel end of frame (EOF) 514 may be 1 byte in size. The EOF 514 indicates the end of the embedded Fibre Channel frame. The Ethernet FCS 516 is inserted after the Fibre Channel EOF 514.

FIG. 5B shows a standard 24-bit Fibre Channel address identifier 524. The address identifier 524 includes a Domain_ID 518, an Area_ID 520, and a Port_ID 522. The Domain_ID 518 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 520 is an Area identifier based on the middle 8 bits of the 24-bit Fibre Channel address. The Area_ID 520 applies either to (a) one or more N_Ports within and attached to a Fibre Channel switch, or (b) to an Arbitrated Loop of NL_Ports attached to a single FL_Port.

The Port_ID 522 is the lower 8-bits of a Fibre Channel address. The Port_ID 522 applies to either (a) a single N_Port or virtualized N_Port within a Domain/Area, (b) the valid AL_PA of a single NL_Port or FL_Port on an Arbitrated Loop.

FIG. 5C shows an example of the FC header 508 of FIG. 5A. The following frame header fields that are used in the present methods are:

D_ID 508A—A 24-bit Fibre Channel frame header field that contains the destination address for a frame; and S_ID 508B—A 24-bit Fibre Channel frame header field that contains the source address for a frame.

R_CTL 508C—A routing control flag in a Fibre Channel header.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A network device, comprising:
   a port for receiving a multicast packet;
   a multicast data structure for maintaining information regarding a multicast group to which the multicast packet is to be sent; wherein the multicast data structure stores a multicast vector having a bit for each port of the network device and a bit setting indicates when any port is part of the multicast group; and
   a link aggregation group (LAG) data structure for storing a LAG vector that stores bit settings indicating which port is part of a LAG;
   wherein when the multicast packet is received by the port, then a corresponding multicast vector and a corresponding LAG vector are obtained and any port that is a member of the LAG is removed from the multicast group such that the multicast packet is not sent to any member of the LAG.

2. The network device of claim 1, wherein the network device is a switch coupled to one or more devices.

3. The network device of claim 1, further comprising: a plurality of sub-ports, wherein one of the plurality of sub-ports is configured to operate as a Fibre Channel port.

4. The network device of claim 3, wherein one of the plurality of sub-ports is configured to operate as an Ethernet port or a Fibre Channel over Ethernet port (FCoE).

5. The network device of claim 3, wherein when LAG is not used, then the port receiving the multicast packet is removed from the multicast vector to avoid a multicast storm.

6. The network device of claim 1, wherein a plurality of LAG vectors corresponding to different packet tags are used to determine LAG members.

7. A machine implemented for a network device having a plurality of ports for sending and receiving information, comprising:
   maintaining a multicast data structure at a port of the network device for storing information regarding a multicast group; wherein the multicast data structure stores a multicast vector having a bit for each port of the network device and a bit setting indicates when any port is part of the multicast group;
   maintaining a link aggregation group (LAG) data structure for storing a LAG vector that stores bit settings indicating which port from among the plurality of ports is part of a LAG;
   receiving a multicast packet at the port of the network device; and
   obtaining a multicast vector from the multicast data structure and a LAG vector from the LAG data structure corresponding to the multicast packet for removing any port that is a member of a LAG such that the multicast packet is only transmitted to non-LAG members and is not transmitted to any LAG member.

8. The method of claim 7, wherein the network device is a switch coupled to one or more devices.

9. The method of claim 7, wherein the network device include a plurality of sub-ports, where one of the plurality of sub-ports is configured to operate as a Fibre Channel port.

10. The method of claim 9, wherein one of the plurality of sub-ports is configured to operate as an Ethernet port or a Fibre Channel over Ethernet port (FCoE).

11. The method of claim 7, wherein when LAG is not used, then the port receiving the multicast packet is removed from the multicast vector to avoid a multicast storm.

12. The method of claim 7, wherein a plurality of LAG vectors corresponding to different packet tags are used to determine LAG members.

13. A non-transitory, storage medium, machine readable storage medium having stored thereon instructions for performing a method, for a network device having a plurality of ports for sending and receiving information, comprising machine executable code which when executed by at least one machine, causes the machine to:
   store a multicast data structure at a port of the network device for storing information regarding a multicast group; wherein the multicast data structure stores a multicast vector having a bit for each port of the network device and a bit setting indicates when any port is part of the multicast group;
   store a link aggregation group (LAG) data structure for storing a LAG vector that stores bit settings indicating which port from among the plurality of ports is part of a LAG;
   receive a multicast packet at the port of the network device; and
   obtain a multicast vector from the multicast data structure and a LAG vector from the LAG data structure corresponding to the multicast packet for removing any port that is a member of a LAG such that the multicast packet is only transmitted to non-LAG members and are not transmitted to any LAG member.

14. The non-transitory, storage medium of claim 13, wherein the network device is a switch coupled to one or more devices.

15. The non-transitory, storage medium of claim 13, wherein the network device include a plurality of sub-ports, where one of the plurality of sub-ports is configured to operate as a Fibre Channel port.

16. The non-transitory, storage medium of claim 15, wherein one of the plurality of sub-ports is configured to operate as an Ethernet port or a Fibre Channel over Ethernet port (FCoE).

17. The non-transitory, storage medium of claim 13, wherein when LAG is not used, then the port receiving the multicast packet is removed from the multicast vector to avoid a multicast storm.

18. The non-transitory, storage medium of claim 13, wherein a plurality of LAG vectors corresponding to different packet tags are used to determine LAG members.

\* \* \* \* \*